United States Patent [19]

Glass et al.

[11] Patent Number: 4,675,190

[45] Date of Patent: Jun. 23, 1987

[54] DISPENSABLE CHEWING GUM COMPOSITION, AND METHOD OF MAKING SAME

[75] Inventors: Michael Glass, Fairlawn; Vincent Corsello, Cedar Knolls, both of N.J.; Ewa Kielczewski, Franklin Square, N.Y.

[73] Assignee: Warner-Lambert Company, Morris Plains, N.J.

[21] Appl. No.: 804,210

[22] Filed: Dec. 3, 1985

[51] Int. Cl.[4] ............................................. A23G 3/30
[52] U.S. Cl. .......................................... 426/5; 426/6; 426/115; 426/410
[58] Field of Search .................... 426/3, 5, 6, 115, 410

[56] References Cited

U.S. PATENT DOCUMENTS

| | | | |
|---|---|---|---|
| 3,570,417 | 3/1971 | Harrmann et al. | |
| 3,862,338 | 1/1975 | Sapowitz. | |
| 3,912,817 | 10/1975 | Sapowitz. | |
| 4,233,319 | 11/1980 | Fritz et al. | |
| 4,254,148 | 3/1981 | Ogawa et al. | 426/3 |
| 4,271,197 | 6/1981 | Hopkins | 426/3 |
| 4,352,823 | 10/1982 | Cherukuri et al. | 426/5 |
| 4,399,154 | 8/1983 | Puglia | 426/5 |
| 4,409,244 | 10/1983 | Cherukuri et al. | 426/5 |
| 4,514,423 | 4/1985 | Tezuka et al. | 426/3 |
| 4,526,790 | 7/1985 | Samala | 426/5 |

FOREIGN PATENT DOCUMENTS

| | | | |
|---|---|---|---|
| 2523836 | 8/1976 | Fed. Rep. of Germany. | |
| 2704829 | 8/1978 | Fed. Rep. of Germany. | |
| 0086769 | 8/1983 | France. | |
| 4037268 | 10/1974 | Japan | 426/3 |
| 50-15854 | 6/1975 | Japan | 426/3 |
| 0050858 | 4/1980 | Japan | 426/3 |

*Primary Examiner*—Jeanette Hunter
*Attorney, Agent, or Firm*—Daniel A. Scola, Jr.; Henry C. Jeanette; Gary M. Nath

[57] ABSTRACT

A chewing gum composition having a low viscosity range and high cohesivity which is suitable for dispensing from a container, such as a squeezable tube, under mild pressure which includes high molecular weight resin-containing gum base in an amount of 15-25%, a cohesive sweetening-bulking component in an amount of from about 15% to about 82%, crystallization inhibitor in an amount of from about 1-15%, and a fine-tuning fluidization component in an amount of from about 0.5%-15% by weight.

13 Claims, No Drawings

DISPENSABLE CHEWING GUM COMPOSITION, AND METHOD OF MAKING SAME

BACKGROUND OF THE INVENTION

The present invention relates to the art of chewing gum compositions, and, in particular, to chewing gum compositions having combined cohesivity and flowability characteristics suitable for novelty delivery systems.

It is known to provide chewing gum compositions which include a water soluble flavor portion which is dissipated over a period of time and a base portion which is insoluble and is retained in the mouth throughout chewing. In most cases, components can be selected for different compositions based on their known attributes and effect on the overall gum mass.

Selection of components in order to achieve a composition having a certain organoleptic effect, while many times a complicated procedure, can be resolved by analysis of the components in accordance with their somewhat predictable contributions to a gum composition. When, however, a resultant composition having a known organoleptic property or set of properties is formulated, and the overall composition must necessarily retain other superimposed physical characteristics for use in a particular environment or for delivery in a unique delivery system, the problem of formulating an appropriate composition can be a seemingly impossible task.

So it seems to be the case, when it is desired to provide a chewing gum composition possessing good organoleptic qualities for sustained chewing while at the same time being capable of use in a unique delivery system such as a mild pressure delivery system from a container. Such delivery systems can include, for example, a flexible tube, a mechanical pump, or a hydraulic pump.

Attempts in the past have proven to be unsatisfactory. For example, European Patent application No. 86769 A1 discloses a chewing gum with a fluid paste-like consistency for packaging in flexible containers from which the consumer can dispense any desired amount. The European Patent Application discloses a chewing gum including 15 to 25% gum base, 40 to 60% of 60 DE glucose syrup, 20 to 40% of icing or glaze sugar, 0.1 to 5% glycerol, 0 to 1% flavor, 0.2 to 0.4% lecithin, and 1 to 4% sorbitol. The resulting gum has a short-textured paste-like consistency and does not provide the consumer with the normal type of chewing gum product to which he is accustomed.

Another disclosure DT No. 2704-829 discloses a chewing gum paste composition which is purported to have a good effect on teeth and which are packed in one-way tubes of metal foil or, optionally, of soft flexible plastic, e.g., high pressure polyethylene or polyvinylchloride. The tubes are similar to toothpaste tubes, but preferably have a larger discharge point which is 1.5×2 wider than toothpaste. The chewing gums have an increased glucose content to insure pasty consistency. As in the previous disclosure, the type of gum contemplated in this disclosure is a short-textured paste-type of composition rather than a commercially acceptable normal chewing gum composition.

In order to solve the problem of how to provide a chewing gum composition which has a low enough viscosity range to allow the gum to flow out of, for example, a squeeze tube, high amounts of hygroscopic/humectant type of material such as 60 DE corn syrup and/or sorbitol have been used, which results in a tacky, non-cohesive gum which does not have good consistency upon chewing nor good film-forming characteristics for bubble blowing. Any attempt to retain a higher rigidity and consistency in the cud or bolus results in a high viscosity and, thus, a non-flowable gum product unsuitable for use in a squeeze tube or low pressure type of delivery system.

In order to resolve the problem of providing a normal, organoleptically-acceptable, and appealing gum product for delivery in a low pressure delivery system, one can not turn to the known gum art since the role of the components required to produce a flowable gum are generally considered inconsistent with providing acceptable cohesivity in the finished gum composition. Thus, the problem arises of trying to provide an acceptably cohesive gum product which, at the same time, has sufficient flowability to be delivered from a container such as a squeeze tube by use of low pressure—two opposed gum characteristics.

It is an object of the present invention to resolve these and other problems associated with formulating a desirable gum composition which is capable of use in a low pressure delivery system as, for example, novelty squeeze tube packaging. This object has been achieved in the present invention by a unique and synergistic combination of components in certain specified ranges beyond which the gum either loses cohesivity or is rendered too viscous for use in a low pressure delivery system.

BRIEF DESCRIPTION OF THE INVENTION

The present invention is a chewing gum composition having a low viscosity range and high cohesivity which is suitable for dispensing from a container under mild pressure. The present composition includes a high molecular weight resin-containing base in an amount of from about 15 to about 25% by weight, a cohesive sweetener-bulking component in an amount of from about 15% to about 82% by weight of the overall composition, a crystallization inhibiter preferably in an amount of from about 1% to about 15% by weight and a fine-tuning fluidization component of from about 0.5 to about 15% for attaining just the right amount of flowability for delivery from a tube, or pump-activated container. Preferably the composition can include from about 17 to about 22% base, from about 20 to 65% sweetener-bulking component, from about 3 to about 10% crystallization inhibitor, and from about 2 to about 10% by weight fine-tuning fluidization component.

The cohesive sweetener-bulking component can include ingredients selected from the group consisting of corn syrup having a dextrose equivalent (DE) of about 61–67 sugar (preferably pulverized), and fructose. A particularly effective range of such components has been found to be corn syrup (61–67 DE) in an amount of from about 10% to about 35%, pulverized sugar in an amount of from about 15% to about 73%, and, optionally, fructose in an amount of from about 8% to about 22% by weight.

The crystallization inhibitor can be selected from one of hydrogenated starch hydrolysate, mannitol, and combinations thereof, in an amount of from about 1% to about 8% by weight of hydrogenated starch hydrolysate (e.g., Lycasin TM) and/or from about 1% to about 6% by weight mannitol.

The fine-tuning fluidization component is usually a combination of ingredients selected from the group consisting of lecithin, both high acetone-insoluble, e.g., having over 80% insolubility, and preferably about 95% insolubility, and low acetone-insoluble lecithin, which is from about 61% to about 65% acetone insoluble. Glycerin, acetylated glycerols, especially glycerol triacetate (or triacetin), oleaginous plasticizers, and combinations thereof can also be included. In a preferred embodiment, a fine-tuning fluidization component can be provided which includes from about 0.1 to about 1% by weight 95% acetone-insoluble lecithin, from about 0.1% to about 0.5% by weight 61% to 65% acetone-insoluble lecithin, from about 1% to about 10% glycerin, glyceryl triacetate in an amount of from about 0.1% to about 0.5%, and vegetable oil in an amount of from about 0.2% to about 1%.

In a most preferred embodiment of the present invention, the gum can be bubble gum which has good film forming characteristics while at the same time being sufficiently flowable to be delivered into and out of a flexible tube or hand pump without sacrificing the necessary bubble gum characteristics. In this particularly difficult situation, it has been found that a gum base can be provided which has high molecular weight polyvinylacetate, e.g., at least about 20,000 M.W.U. and is preferably between 20,000 and 70,000 M.W.U. Other resins can be used depending on the property of the final gum composition and can be selected from polyvinyl butyl ester, copolymers of vinyl esters and vinyl ethers, polyethylene, ethylene vinyl acetate copolymers, vinyl acetate-vinyl alcohol copolymers, vinyl acetate-vinyl laurate copolymers. The resin component of the base can be present in an amount of from about 5 to about 55% of the weight of the base.

Softeners or plasticizers for the resin component can be those known in the art, and can include glyceryl triacetate, acetylated monoglyceride, and others well known in the art, and are usually included in the base in an amount of from about 1% to about 18%, and preferably from about 6% to about 14%. It has been found that a gum base that is particularly useful and has superb results for use in a low pressure delivery system is a gum base which includes about 8% of glyceryl triacetate.

The second component which is normally found in all normal gum base formulations is an elastomer component which can be selected from the synthetic elastomer components such as styrene-butadiene copolymer, polyisobutylene, isobutylene-isoprene copolymer, natural rubber (polyisoprene) as well as other masticatory substances of natural origin such as rubber latex solids, chicle, crown gum, nispero, rosidinha, jelutong, pendare, perillo, niger gutta, tunu, etc. A preferred elastomer in the present invention is a styrene-butadiene (SBR) elastomer along with ester gums which can be included in the base within a range of from about 2% to about 28% and is preferably, in the most preferred form of the present invention, included in an amount of from about 9 to about 20%.

Finally, other components used to render the base particularly suitable for particular purposes can be included such as fillers, especially dicalcium phosphate, waxes such as parrafin and microcrystalline wax, and softening agents and/or lubricants such as glycerol monostearate, lecithin, coconut oil, fatty acids, and the glyceryl esters of fatty acids, etc. These can be included in an amount of from about 2 to about 25% and are preferably included in an amount of from about 15 to about 22%.

The chewing gum base is used in the present composition, especially in bubble gum composition, to provide high cohesivity and good film forming properties, but is rendered sufficiently flowable, e.g., having a low enough viscosity range, to exit the tube under mild pressure. The gum composition itself can include such a base so long as it contains a high molecular weight resin, which, can preferably be high molecular weight polyvinylacetate.

The gum base is combined with the cohesive sweetener-bulking component which when mixed into the composition should provide a sweetening and bulking effect to the gum which will not give it a wet or pasty appearance, nor will it provide a high degree of tackiness which would detract from its cohesiveness and its organoleptic appeal. Such a sweetener-bulking component can have ingredients selected from the group consisting of corn syrup which has a dextrose equivalent (DE) of from about 61 to 67, which is a departure from the usual 60 DE corn syrup used in gum compositions. Furthermore, sugar can be included as an ingredient, especially pulverized sugar and, finally, fructose can be included in combination with one of the other ingredients so that the overall amount of the sweetening/bulking component can be from about 15 to about 82% by weight.

Finally, flavor and color additives are usually included in the gum compositions in order to yield the desired final gum product. This component can be included in an amount of from about 0.2% to about 2.5% of the final composition.

It is only as a result of the synergistic combination of the components as described above, that normally opposed objectives of high cohesivity and low viscosity range can be achieved so that the composition can be readily packed into and delivered from a mild pressure delivery system such as a flexible tube or a hand pump.

Thus, whereas EPA No. 86769 A1 discloses a high humectant-containing gum composition which requires, for example, 60 DE glucose syrup, glaze sugar, and sorbitol, the present composition has overcome textural and body deficiencies of tube gum by a new and unsuggested combination excluding such high humectant and tacky components.

For a better understanding of the present invention, together with other and further objects, reference is made to the following description, and its scope will be pointed out in the appended claims.

DETAILED DESCRIPTION OF THE INVENTION

The chewing gum composition of the present invention is characterized by a low viscosity range and high cohesivity making it suitable for dispensing from a container such as a novelty container under mild pressure. Such containers can include metal foil containers or flexible plastic containers and can also include mechanical and/or hydraulic pump type containers. These containers are probably best described by referring to the toothpaste art and the different systems used for delivering toothpaste.

As can be appreciated the texture of toothpaste is quite short and very pasty, which is contrary to producing a high quality consumer-acceptable organoleptically pleasing gum product.

A major component deemed necessary for the present invention is a soft cohesive base which contains a high molecular weight resin. This type of base enhances the cohesivity and also, in at least one preferred embodiment, provides good film forming characteristics. It has been found that a preferable high molecular weight resin is high molecular weight polyvinylacetate having a molecular weight of at least about 20,000 MWU which is plasticized by use of an agent such as glyceryl triacetate alone or in combination with acetylated monoglyceride. Other resins which could be used include polyvinyl butyl ester, copolymers of vinyl esters and vinyl ethers, polyethylene, ethylene-vinyl acetate copolymers, vinyl acetate-vinyl alcohol copolymers, vinyl acetate vinyl laurate copolymers in an amount of from about 5 to about 55% of the gum base and preferably from about 25% to about 35% of the gum base.

Other plasticizers which may be used to plasticize the resin include but are not limited to benzyl-benzoate, butyrate, phenyl acetate, butyl-2-decenoate, citronellyl butyrate, cresyl acetate, ethyl acetate, diethyl malonate, diethyl sebacate, triethyl citrate, diethyl succinate, glyceryl tributyrate, ethyl laurate, ethyl acetoacetate, diethyl tartrate, ethyl or butyl lactate, acetyl triethyl citrate, diethyl malate, ethyl oleate, sucrose octaacetate, diacetyl tartaric acid, ester of mono and diglycerides, stearyl monoglyceridyl citrate, castor oil, succinylated monoglycerides, lactylic and glyceryl lacto esters of fatty acids, or combinations thereof, in an amount of from about 2 to about 22% of the gum base, and preferably of from about 3 to about 15%.

The base component can contain other normal base type of materials such as elastomers and plasticizers therefor as well as fillers, waxes, softeners, texturizers, emulsifying agents, etc. One particular base particularly suitable for use in the present invention as follows:

| Components | % by Weight of Gum Base |
| --- | --- |
| Elastomer | 8-20% |
| Oleaginous Plasticizer | 8-30% |
| Mineral Adjuvants | 5-25% |
| Fatty Acids | 0-20% |
| Elastomer Solvent | 10-20% |
| Resin | 20-55% |
| Plasticizer | 3-15% |
| Antioxidant/Preservatives | 0-2% |

A specific formula which is found effective in the present gum composition is as follows:

| Components | % by Weight of Gum Base |
| --- | --- |
| Elastomer | 16% |
| Oleginous Plasticizer | 22% |
| Mineral Adjuvants | 12% |
| Elastomer Solvent (Ester Gums) | 15% |
| Resin | 27% |
| Plasticizer | 7% |
| Antioxidant/Preservatives | 1% |

The gylcerol triacetate has been found to be especially effective in the present invention since it is a plasticizer which is not particularly hygroscopic, and, therefore, does not detract from the cohesivity of the overall gum composition.

The next component of the present composition is a cohesive sweetener-bulking component which can have ingredients selected from the group consisting of corn syrup having a dextrose equivalent (DE) of from about 61 to about 67, sugar which is pulverized, and fructose or combinations of these ingredients in an amount of from about 15% to about 82% by weight of the overall composition.

An example of the ranges of the different ingredients which can be used in the cohesive sweetner-bulking component are shown in the Table below.

| COHESIVE SWEETENER-BULKING COMPONENT ||
| --- | --- |
| Component | Weight by % |
| Corn Syrup (61-67 DE) | 10% to 35% |
| Pulverized sugar | 15% to 73% |
| Fructose | 0% to 22% |

In a specific example a particularly effective composition has been found which includes the following weight percentages of a cohesive sweetner-bulking component.

| SPECIFIC SWEETENER-BULKING COMPONENT ||
| --- | --- |
| Component | Weight by % |
| Corn Syrup (61-67 DE) | 25% |
| Pulverized Sugar | 42% |

Another combination useful in the present invention is provided as follows:

| Component | Weight by % |
| --- | --- |
| Corn Syrup (61-67 DE) | 20% |
| Pulverized Sugar | 33% |
| Fructose | 12% |

The third component for use in the present gum composition is a crystallization inhibiter for preventing sugar from crystallizing and thus maintaining a fluid formulation, which does not appear wet, and is not sticky, and is sufficiently fluid for discharge from a squeezable tube. This component has been found to be conveniently provided by the use of hydrogenated glucose syrup or hydrogenated starch hydrolysates, such as Lycasin TM, and/or mannitol in a total amount of from about 1 to about 15% by weight of the gum composition.

Finally, the present gum composition must have a fine-tuning fluidization component for fine-tuning the gum to provide a flowable composition usable in a mild pressure delivery system. The fine-tuning fluidization component can include ingredients such as high and low acetone insoluble lecithin, glycerin, acetylated glycerols, especially glyceryl triacetate (Tracetin), and oleaginous plasticizers, and combinations thereof in an amount of from about 0.5% to about 15% by weight. As shown below in the Table, the ranges of the components can be as indicated therein.

| FINE-TUNING FLUIDIZATION COMPONENT ||
| --- | --- |
| Component | Weight by % |
| Lecithin (high and low acetone-insoluble) | 0.1% to 2% |
| Glycerine | 0.5% to 10% |
| Acetylated glycerols | 0.1% to 2.5% |
| Oleaginous plasticizers | 0.1% to 5% |

A particularly effective fine-tuning component has been found to result from the following composition range:

| SPECIFIC FINE-TUNING FLUIDIZATION COMPONENT | |
|---|---|
| Component | Weight by % |
| High acetone insoluble lecithin (95% insoluble) | 0.1% to 1% |
| Low acetone insoluble lecithin (61-65% insoluble) | 0.1% to 0.5% |
| Glycerin | 1% to 10% |
| Glyceryl triacetate | 0.1% to 0.5% |
| Vegetable oil | 0.2% to 1% |

A gum composition can be prepared based on the following ranges of required components.

| INVENTIVE GUM COMPOSITION RANGES | |
|---|---|
| Component | Range by Weight % |
| High molecular weight resin containing base | 15-25% |
| Cohesive sweetener-bulking component | 15-82% |
| Crystallization inhibitor | 1-15% |
| Fine-tuning fluidization component | 0.5-15% |

A preferred gum composition can be prepared based on the following ranges of required components.

| PREFERRED GUM COMPOSITION RANGES | |
|---|---|
| Component | Range by Weight % |
| High molecular weight resin containing base | 17-22% |
| Cohesive sweetener-bulking component | 20-65% |
| Crystallization inhibitor | 3-10% |
| Fine-tuning fluidization component | 2-10% |

SPECIFIC EXAMPLES

Bubble gum samples of the present invention were prepared and tested against known compositions in a squeeze tube type of dispenser using the following composition.

| Component | Wt. % by Weight (% of Ingredient) |
|---|---|
| Gum base (high molecular weight polyvinyl acetate plus triacetin) | 19.6% |
| Cohesive sweetener-bulking component | 67.0% |
| (61-67 DE corn syrup) | (25%) |
| (pulverized sugar) | (42%) |
| Crystallization inhibitor (hydrogenated starch hydrolysate, Lycasin ™) | 5.0% |
| Fine-tuning Fluidization component | 6.6% |
| (high acetone-insoluble lecithin, 95%) | (0.7%) |
| (low acetone-insoluble lecithin, 61-65%) | (0.2%) |
| (glycerin) | (5.0%) |
| (glyceryl triacetate) | (0.1%) |
| (vegetable oil) | (0.6%) |
| Flavoring | 1.7% |
| Color | .1% |

The composition was prepared by adding the gum base to about one-third of the sweetener-bulking component under mixing and in the presence of both high and low acetone-insoluble lecithin. Afterwards a remainder of the bulking agent was added under mixing conditions along with the glyceryl triacetate vegetable oil glycerin, and hydrogenated starch hydrolysate. In this latter step, flavoring and coloring was also added. Two separate samples, one raspberry flavored and one strawberry flavored, were packaged in squeeze tubes for comparative tests. The tubes have a circular emitting orifice with a diameter of about 0.58".

COMPARISON SAMPLE

A known bubble gum formulation was prepared in accordance with the following formula.

| KNOWN BUBBLE GUM COMPOSITION | |
|---|---|
| Component | Weight by % |
| Gum Base | 17.00 |
| Corn Syrup | 25.00 |
| Softeners | 4.00 |
| Sugar | 53.00 |
| Flavor | 0.70 |
| Color | Trace |

Two samples of the above composition were packaged in the same kind of squeeze tube as the samples of the invention.

Finally, a sample of squeeze tube-packaged gum composition prepared in accordance with the disclosure of EPA No. 86,769 A1 was obtained for comparison with the known bubble gum compositions and the composition of the present invention.

FLOWABILITY TEST

The above compositions were tested to determine magnitude of force required to deliver gum out of a squeeze tube. The test procedure included a Universal Instron tester fixed with a flat surface plunger having an area of about 3.97 sq. inches. Force was applied by the Instron tester against the side of each tube containing a sample of gum composition at a rate of 0.5"/minute until gum was emitted from the tube. The results of the runs are shown below.

| COMPARATIVE TEST RESULTS | |
|---|---|
| Gum Composition | Pressure Required to Deliver Gum Out Of Tube psi |
| Known Tube Gum Composition (EPA 86,769 Al) | 2.27 psi |
| Known Bubble Gum Composition | 62.97 psi |
| Gum Composition of the Invention | 17.00 psi |

Thus, as can be seen, the bubble gum composition of the present invention requires less than one-third the pressure required to deliver known bubble gum, and has a flowability which permits easy delivery from a squeeze tube, i.e., only 17 lbs per square inch. Even though the inventive composition does not have the low-pressure requirement of the known tube gum, it possesses excellent chew characteristics and organoleptic qualities when compared to the tube gum.

In order to demonstrate this superiority in product, chew tests were run comparing the tube gum to the bubble gum of the invention. The test panel was composed of 6 experts who chewed each sample for 5 minutes, reporting the qualities during progressive time periods. The ratings were as follows:

3=Good

2 = Fair
1 = Poor
0 = Unacceptable.
results have been reported below.

COMPARATIVE CHEW TESTS

| Quality Rated | Known Tube Gum (EPA 86,769 Al) | Strawberry Sample Of Invention | Raspberry Sample Of Invention |
|---|---|---|---|
| Initial Chew (0–1 min) | 1.8 | 2.5 | 2.5 |
| Transitional Chew (1–3 min) | 1.8 | 2.3 | 2.5 |
| Final Chew (3–5 min) | 2.2 | 2.5 | 2.7 |
| Bubble (3–5 min) | 1.3 | 2.4 | 2.4 |

The results clearly show the poor quality of the known tube compositions (i.e. covered under EPA 86,769 Al), and, even in the final chew when the quality of chew creeps up to a fair rating of 2.2, the bubble-forming characteristic is a very poor 1.3. On the other hand, the gums of the invention have a very good 2.5 initial chew which is substantially retained throughout the test while at the same time possessing a high bubble-forming quality. Moreover, it was noted by the panel that the cud of the known tube gum remaining after completion of the test was very tacky, noncohesive, and had an unpleasant texture, whereas the remaining cud of the inventive compositions were very good.

Consequently, the combination of specified ranges of components of the present invention surprisingly provides a high quality bubble gum which retains its quality during chewing and which has a flowability sufficient to enable delivery out of a container, such as a squeeze tube, at low pressure.

Accordingly, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

We claim:

1. A chewing gum composition having a low viscosity range and high cohesivity which is suitable for dispensing from a container under mild pressure comprising:
   high molecular weight resin-containing gum base in an amount of from about 15 to about 25% by weight, said resin having a molecular weight of at least about 20,000 M.W.U.,
   a cohesive sweetening-bulking component in an amount of from about 15% to about 82% by weight, said sweetening-bulking component being selected from the group consisting of: corn syrup having a dextrose equivalent of about 61 to about 67, sugar, pulverized sugar, and fructose,
   crystallization inhibiter in an amount of from about 1% to about 15% by weight, said crystallization inhibitor being selected from the group consisting of hydrogenated starch hydrolysate, mannitol, hydrogenated glucose syrup, and combinations thereof, and
   fine-tuning fluidization component in an amount of from about 0.5% to about 15% by weight, said fine-tuning fluidization component being selected from the group consisting of: lecithin, glycerin, acetylated glycerols, oleaginous plasticizers, and combinations thereof.

2. The chewing gum composition of claim 1 which is a bubble gum having from about 17 to about 22% by weight of said base, from about 20 to 65% by weight of said sweetening-bulking comonent, from about 3 to about 10% by weight of said crystallization inhibitor, and from about 2 to about 10% by weight of said fluidization component.

3. The chewing gum composition of claim 1 wherein said high molecular weight resin-containing base comprises:
   polyvinyl acetate having a molecular weight of at least about 20,000 M.W.U. in an amount of from about 25% to about 35% by weight, and a nonhygroscopic plasticizer in an amount of from about 6% to about 14% by weight of the base.

4. The chewing gum composition of claim 3 wherein said non-hygroscopic plasticizer, Comprises glyceryl triacetate.

5. The, cohesive sweetener-bulking component as described in claim 5 which includes 61–67 DE corn syrup in an amouht of from about 10% to about 35%, and pulverized sugar in an amount of from about 16% to about 73%.

6. The cohesive sweetener-bulking component of the claim 4 which comprises:
   61–67 DE corn syrup in an amount of from about 10% to about 35%, pulverized sugar in an amount of from about 15% to about 73%, and fructose in an amount of from about 0% to about 22%.

7. The chewing gum composition of claim 1 wherein said crystallization inhibitor is selected from the group consisting of hydrogenated starch hydrolysates and mannitol.

8. The chewing gum composition of claim 7 wherein said crystallization inhibitor comprises hydrogenated starch hydrolysates in an amount of from about 1% to about 8%.

9. The chewing gum composition of claim 2 in which said crystallization inhibitor comprises hydrogenated starch hydrolysates in an amount of from about 1% to about 10% and mannitol in an amount of from about 0% to about 8%.

10. The chewing gum composition of claim 1 wherein said fine-tuning fluidization component is selected from the group consisting of lecithin being insoluble in acetone in an amount of at least 80%, and lecithin being insoluble in acetone in an amount of from about 61% to about 65%.

11. The chewing composition of claim 10 wherein said fine-tuning fluidization component comprises lecithin being 95% insoluble in acetone in an amount of from about 0.1% to about 1.0%, lecithin being 61–65% insoluble in acetone in an amount of from about 0.1 to about 0.5%, glycerin an amount of from about 1.0% to about 10.0%, glyceryl triacetate in an amount of from about 0.1% to about 0.5% and vegetable oil in an amount of from about 0.2% to about 1.0%.

12. The chewing gum composition of claim 1 which can be delivered through an orifice of about 0.573" dia. to about 0.592" dia. dimension under an applied pressure of from about 12 psi to about 25 psi while maintaining a cohesive, non-tacky, continuous consistency.

13. The chewing gum composition of claim 12 wherein said applied pressure is from about 15psi to about 20 psi.

* * * * *

UNITED STATES PATENT AND TRADEMARK OFFICE
CERTIFICATE OF CORRECTION

PATENT NO. : 4,675,190

DATED : June 23, 1987

INVENTOR(S) : Michael Glass et al

It is certified that error appears in the above-identified patent and that said Letters Patent is hereby corrected as shown below:

In Claim 5, line 2 thereof, "claim 5" should read --claim 1--.

In Claim 11, line 6 thereof, before "an" should read --in--

In Claim 12, line 2 thereof, after "of" insert --from--.

In Claim 13, line 2 thereof, "15psi" should read --15 psi--.

Signed and Sealed this

Sixteenth Day of February, 1988

Attest:

DONALD J. QUIGG

Attesting Officer

Commissioner of Patents and Trademarks